United States Patent Office 3,702,302
Patented Nov. 7, 1972

3,702,302
TRUE SELF-HEATING COMPOSITION
Vernon Columbus Wilson, 611 High St., Apt. 12–D,
Newark, N.J. 07102
No Drawing. Filed May 28, 1970, Ser. No. 41,625
Int. Cl. B01j 13/00; C09k 3/00, 3/02
U.S. Cl. 252—70          2 Claims

ABSTRACT OF THE DISCLOSURE

This invention relates to a true self-heating one-unit composition which will produce heat when applied. This unique self-heating unit does not require mixing with another element outside of its composition to generate heat.

This unique one-unit composition also antiquates many other multi-unit compositions or other compositions which require mixing with another element to produce a desired result by making them a single one-unit self-contained composition. In one embodiment, the one-unit, heat-producing composition consists essentially of two different water-in-oil emulsion gels having the same viscosity and being in contact with each other, the first water-in-oil emulsion gel having hydrogen peroxide in its water phase and the second water-in-oil emulsion gel having potassium sulfite in its water phase.

---

The invention described herein is a true self-heating *one unit* composition, which will produce heat when applied.

This unique self-heating unit does not require mixing with another element outside of its composition to generate heat. A clear and definite advantage over all other heat generating compositions which require mixing with *another* composition or element to work.

This invention (unique composition) can be a gel, aerosol, liquid, ointment, cream or paste. In either form an exothermic (heat producing) reaction is sparked when the composition is rubbed or used.

This concept makes possible the use of many known elements which when mixed together will create an exothermic (heat generating) reaction. What is unique about this invention is the system in which the heat generating compounds or elements are incorporated.

It is one which will prevent the two or more elements used to generate heat when mixed, from reacting with each other within the finished product, and permits the use of certain active chemicals such as hydrogen peroxide which at certain percentages is irritating to the skin to be incorporated in a form safe to handle without irritation.

The principle behind this invention is putting at least one of the active elements needed to create an exothermic reaction (to generate heat) or needed to react with another element in order to produce a desired effect when product is applied or used, into a separate emulsion within the composition so that the outer phase of that emulsion will act as a barrier, preventing it from reacting with another element needed to generate heat or produce another desired effect prematurely, even though they are all in one container.

For example hydrogen peroxide in the water phase of a water in oil micro emulsion (gel) will not react with potassium sulfite if the potassium sulfite is in the water phase of another water in oil micro emulsion (gel) when mixed together in such a way that both gels maintained their separate phases.

Having these two gels at the same viscosity, the results would be a finished product which could be a clear gel, but are in substance two separate micro emulsions, forming one preparation (composition). As one could see, rubbing the gelled composition would cause the two water phases to come together producing an exothermic reaction.

Pharmaceutical and cosmetic compositions for application to the skin or hair are often more effective for their intended purpose if they are applied hot. Heat can aid the penetration of active ingredients into the skin and hair. Heat also plays an important part in hair setting preparations.

One object of this invention is to provide a true self-heating composition for application to the hair and skin. (Other preparations that require mixing with another are not truly self-heating.)

Another object of this invention is to provide a one-unit composition to be applied to the skin or hair that will heat when applied.

Still another object of this invention is to provide a complete self-heating composition which can be packaged in a single one-unit container and package.

A further object of this invention is to provide a unique helf-heating system for cosmetics, medicinals, and pharmaceutical preparations in which heat will improve and/or aid its application and/or penetration and/or effectiveness and/or acceptability.

Still a further object of this invention is to provide for a unique self-heating hair preparation in which heat will aid setting, treating, grooming, conditioning, cleansing or acceptability.

Other and further objects of this invention is to provide a new and better way for making heat-forming aerosols.

Another and still further object of this invention is to eliminate the need for the inner bag such as those now used in the heat forming shave creas aerosols, and in some single unit aerosol hair dyes or coloring agents.

The inner bag in those aerosols contains an oxidizing agent.

Other and still further object of this invention is to provide a way for eliminating the need for all multiple part compositions in which the active ingredients which necessitate separate compositions can be incorporated into one container being kept from reacting prematurely in a manner heretofore mentioned.

In this invention water phases can be separated from water phases, oil phases from oil phases, water phases from oil phases.

Additives can be used such as waxes, casein, celluloses, alginic acid salt and derivatives, zein, tragacanth, pectin, resins, quince seed gel, bentonite, Veegum, zinc oxide, zinc stearate, sodium silicate, talc, stearic acid, titanium dioxide, silicones, surfactants, polar and nonpolar materials, cationics, gelling agents, nonionics, ionics, fluorocarbons, and/or hydrocarbons, to aid or strengthen barriers to help prevent the active ingredients from reacting inside the container and/or to help them to react at the time desired.

Of the many surfactants found useful in this type formula the mono- and diglycerides of fat-forming fatty acids (Arlacel 186—Atlas) in combination with sorbitol U.S.P. (Sorbo—Atlas), to form a gel base have been very effective.

The following gives several combinations for a heat forming cream base useful in a variety of cosmetic and pharmaceutical preparations.

The following formulas are written in two parts.

FORMULA GUIDE.—"PART ONE" OF FORMULA

| Ingredients | Group 1 | Group 2 | Group 3 | Group 4 | Group 5 |
|---|---|---|---|---|---|
| Gel base: Arlacel 186, 1 part / Sorbo, 9 parts | 30–60% | 30–60% | 30–60% | 30–60% | 30–60%. |
| Mineral oil | | | | | 11–20%. |
| Paraffin wax | | | | | |
| Petrolatum | Any one up to 11% | 1–5% | 1–5% | 5% | |
| Cottonseed oil | | Either one up to 11% | Either one up to 11% | | |
| Lanolin | | | | | |
| Beeswax | 1–5% | | | | 1–5%. |
| Ceresin wax | 1–5% | 1% | 1% | | 1–5%. |
| Oleyl alcohol | | | | | |
| Isopropyl myristate | | | | Any one at 3% | |
| Stearic acid (triple-pressed) | | | | | |
| Liquid lanolin fraction | | | | | |
| Arlacel 186 | | | 2% | | |
| Hydrogen peroxide 10–35% solution | q.s. 100% | q.s. 100% | q.s. 100% | q.s. 100% | q.s. 100%. |

FORMULA GUIDE.—"PART TWO" OF FORMULA

| Ingredients | Group 1 | Group 2 | Group 3 | Group 4 | Group 5 |
|---|---|---|---|---|---|
| Gel base: Arlacel 186, 1 part / Sorbo, 9 parts | 30–60% | 30–60% | 30–60% | 30–60% | 30–60%. |
| Paraffin wax | | | | | |
| Mineral oil | | | | | 11–20% |
| Petrolatum | Any one up to 11% | 1–5% | 1–5% | 5% | |
| Cottonseed oil | | Either one up to 11% | Either one up to 11% | | |
| Do | | | | | |
| Lanolin | | | | | |
| Beeswax | 1–5% | | | | 1–5%. |
| Ceresin wax | 1–5% | 1% | 1% | | 1–5%. |
| Isopropyl myristate | | | | | |
| Liquid lanolin fraction | | | | Any one at 3% | |
| Oleyl alcohol | | | | | |
| Stearic acid (triple-pressed) | | | | | |
| Arlacel 186 | | | 2% | | |
| Potassium sulfite, 10–20% solution | q.s. 100% | q.s. 100% | q.s. 100% | q.s. 100% | q.s. 100%. |

PROCEDURE

"Part One" and "Part Two" are to be mixed separately using group 1, 2, 3, 4, or 5 in formula guide parts "I" and "II."

For example, using group 1, part "I" will consist of the ingredients in group 1. Part "II" will consist of the ingredients in group 1, Part "II." (Results can also be obtained by using another group in Part "II.")

Prepare the intermediate gel base by adding small amounts of Sorbo to the Arlacel 186 and form a thick slurry by using mechanical agitation.

Add remainder of Sorbo slowly with agitation. Add all other ingredients except potassium sulfite or hydrogen peroxide solution. Heat the mixture to 70° C. Next add hydrogen peroxide or potassium sulfite solution at 72° C. Blend well by means of continuous mechanical agitation until cooled to room temperature. After having made two separate phases, one Part "I," the other Part "II," mix Part "I" to Part "II" gently, at the ratio 1 to 2. The ratio can be changed to alter the temperature of heat. With some formulas, cooling below room temperature before mixing the two parts may be necessary to avoid premature reaction. Do not mix when hot.

VISCOSITY, STABILITY, AND HEAT CONTROL

The following methods are available to the formulator for regulating the heat and viscosity of his product and improving stability when required.

Lowering viscosity (a) Increase ratio of oily liquids.
(b) Use lower viscosity oils.
(c) Use lower melting waxes and fats.

Raising viscosity (a) Increase water proportion.
(b) Use higher melting fats and waxes.

Improving stability (a) Vary the level of total gel base ingredients.
(b) Add small increments of Arlacel 186. For example, note that Group 3 in Part I contains an added 2% emulsifier by contrast with Group 2. With certain combinations of ingredients it may be found that this provides greater smoothness of the cream as well as improved stability.
(c) Reduce high-melting waxy materials.
(d) Replace high-melting waxes with low-melting fat and oils.

Heat control

The ratio of hydrogen peroxide to potassium sulfite in a finished product could range approximately from one part to four parts on up to one part to one part. The problem of premature reaction during mixing can be avoided by reinforcing such as by using high-melting fats and waxes and/or mixing while cooled. Other ways have been explained.

Heat-forming compositions can be made using different exothermic materials such as exothermic water sorbing materials. The following formula is in two parts.

PART I OF FORMULA

| | Parts, percent |
|---|---|
| Beeswax | 6 |
| Anhydrous lanolin | 2 |
| Sorbitan monostearate (Span 60) | 0.7 |
| Mineral oil | 35 |
| Polyethylene glycol (molecular weight, 400) | 21.3 |
| Molecular sieve 5A [1] | 35 |

[1] Molecular sieve 5A—solid absorbent material. Could use: Activated alumina, silical gel, alkali metal aluminosilicates (synthetic zeolites).

Procedure: Part I was prepared by melting and mixing the first three ingredients, after which the mineral oil, then the polyethylene glycol were stirred in at about 70° C. Upon cooling to room temperature, the molecular sieve was gently stirred in.

PART II OF FORMULA [1]

| | Parts, percent |
|---|---|
| Gel base | 20 |
|   Arlacel 186, 1 part | |
|   Sorbo, 9 parts | |
| Mineral oil | 20 |
| Ceresin wax | 2 |
| Beeswax | 2 |
| Water | 56 |
| Preservative, q.s. | |

[1] For Part II the formulator could also use Part II of the Formula Guide Chart (col. 3) substituting water for potassium sulfite.

Procedure for Part II: Prepare the intermediate gel base by adding small amounts of Sorbo to the Arlacel 186 and form a thick slurry by using mechanical agitation. Add remainder of Sorbo slowly with agitation. Add the mineral oil, ceresin wax, and beeswax. Heat the mixture to 70° C. Next, add the water at 72° C. Blend well by means of continuous mechanical agitation with a vessel fitting blade to room temperature. Milling is suggested to obtain maximum smoothness and stability.

At 50° C. or cooler pour Part I and II together in one container in a manner that would assure gentle mixing.

riers within each emulsion that will help prevent a reaction from taking place when these two mixtures are poured into the aerosol can and pressurized with a liquid or gas propellant.

The product when actuated from the can will react exothermically when the barriers separating the active exothermic ingredients are broken. With some formulas, rubbing may be necessary to produce the reaction, with others the mere evaporation of the propellant may break the barrier thus bringing on the reaction.

Note.—Hydrogen peroxide used in formulas were sta-

GEL FORMULA

| | Ingredients | Part I, percent | Possible variables | Possible effects | Part II, percent |
|---|---|---|---|---|---|
| A | Sorbitol solution U.S.P. (Sorbo Atlas) | 6.0 | 5.0-9.0%max. polyols 16.0% | Aid clarity stability, grabs | 6.0 |
| | Propylene glycol U.S.P. | 9.5 | 6.0-10.0% max. polyols 16.0% | Stability | 9.5 |
| | Polyoxyethylene fatty glyceride | | Can be varied | | |
| | Arlatone G, Atlas | 15.0 | Combination must have HLB=to M.O., plus Arlatone G for less hardness, plus Brij for hardness. | | 14.0 |
| | Polyoxyethylene (10) oleyl ether | | | | |
| | Brij 97 Atlas | 16.0 | | | 17.0 |
| | Light mineral oil N.F. | | | | |
| | Marcol 70-Humble | 15.0 | 13.0-16.0% | | 15.0 |
| B | Hydrogen peroxide 15.0% | | Hydrogen peroxide solution from 10.0% to 35.0%. | Temperature of heat | |
| | Stabilized solution | 38.0 | | | |
| C | Perfume | 0.5 | | | 0.5 |
| B | 20.0% solution potassium sulfite in deionized water. | | 10.0-25.0% | | 38.0 |
| | Total | 100.0 | | | 100.0 |

PROCEDURE

Note Part "II" made ½ amount by weight of Part "I." Mix Part "II" and Part "I" separately as follows. Heat "A" to 90° C. and "B" to 95° C. with moderate anchor-type stirring. Add "C" at 70° C. At 50° C. to 55° C. gently pour Part "I" and Part "II" into one container in a way that assures even distribution.

AEROSOLS

It is possible to put cream, gels, lotions, ointments, into an aerosol can having such preparation separated from the propellant by some type of plastic bag with the container.

One such container for such a system is called "Sepro" cans. Gels, ointments, creams, lotions of the self-heating type mentioned herein can be put into such an aerosol container. However, it is possible to make a self-heating aerosol preparation based on the system and formula mentioned in this invention, that can be put into a standard aerosol can. By "standard" we mean an aerosol can that does not have a compartment within to separate components of the system.

For example, Freon 11 or Genetron 11 can be made to become part of an emulsion system mentioned in the formula guide. Two separate Freon emulsions can be made, one incorporating the hydrogen peroxide solution, and the other incorporating the potassium sulfite solution. These emulsions can contain additives mentioned, such as silicones, isopropyl myristate, oils, waxes, etc. to form barbilized solutions; all dilutions were made with deionized water.

What I claim is:

1. A one-unit, heat-producing composition consisting essentially of two different water-in-oil emulsion gels having the same viscosity and being in contact with each other, the first water-in-oil emulsion gel having hydrogen peroxide in its water phase and the second water-in-oil emulsion gel having potassium sulfite in its water phase.

2. A one-unit, heat-producing composition consisting essentially of two different emulsion gels having the same viscosity and being in contact with each other, the first emulsion gel being a polyethylene glycol in oil emulsion gel having an exothermic water sorbing material in its polyethylene glycol phase, and the second emulsion gel being a water-in-oil emulsion gel.

References Cited
UNITED STATES PATENTS

| | | | |
|---|---|---|---|
| 2,387,244 | 10/1945 | Compton et al. | 252—188.3 X |
| 2,452,597 | 11/1948 | Olsen | 252—70 X |
| 2,886,532 | 5/1959 | Richmond et al. | 252—186 X |
| 3,164,505 | 1/1965 | Hsieh et al. | 149—2 X |
| 3,341,418 | 9/1967 | Moses et al. | 252—90 X |

RICHARD D. LOVERING, Primary Examiner

U.S. Cl. X.R.

252—90, 188.3, 305, 309, 315, 316; 424—45, 47, 73